United States Patent
Okimoto et al.

(10) Patent No.: US 9,385,997 B2
(45) Date of Patent: Jul. 5, 2016

(54) PROTECTION OF CONTROL WORDS EMPLOYED BY CONDITIONAL ACCESS SYSTEMS

(71) Applicant: General Instrument Corporation, Horsham, PA (US)

(72) Inventors: John I Okimoto, San Diego, CA (US); Alexander Medvinsky, San Diego, CA (US); Lawrence D Vince, Lansdale, PA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 92 days.

(21) Appl. No.: 14/210,351

(22) Filed: Mar. 13, 2014

(65) Prior Publication Data

US 2014/0281537 A1   Sep. 18, 2014

Related U.S. Application Data

(60) Provisional application No. 61/802,090, filed on Mar. 15, 2013.

(51) Int. Cl.
  *H04L 29/06* (2006.01)
  *H04N 21/6334* (2011.01)
  *H04L 9/14* (2006.01)
  *H04N 21/266* (2011.01)
  (Continued)

(52) U.S. Cl.
  CPC .......... *H04L 63/0428* (2013.01); *H04L 9/0869* (2013.01); *H04L 9/14* (2013.01); *H04N 21/26606* (2013.01); *H04N 21/63345* (2013.01); *H04N 21/835* (2013.01); *H04L 9/0822* (2013.01); *H04L 63/0442* (2013.01); *H04L 63/062* (2013.01); *H04L 63/166* (2013.01); *H04L 2209/601* (2013.01); *H04L 2463/062* (2013.01)

(58) Field of Classification Search
  CPC combination set(s) only.
  See application file for complete search history.

(56) References Cited

U.S. PATENT DOCUMENTS 8,520,850 B2    8/2013  Helms et al.
2002/0094084 A1*  7/2002  Wasilewski ......... H04L 63/0442
                                                  380/241

(Continued)

FOREIGN PATENT DOCUMENTS

CN      101790073 A    7/2010
KR   2010-0069373 A    6/2010

OTHER PUBLICATIONS

PCT Search Report & Written Opinion, RE: Application #PCT/US2014/026900; dated Aug. 12, 2014.

(Continued)

*Primary Examiner* — Mahfuzur Rahman
(74) *Attorney, Agent, or Firm* — Thomas A. Ward

(57) ABSTRACT

In accordance with a method for communicating a control word (CW) from a client such as an encryptor to a server such as the entitlement control message generator (ECMG) of a conditional access system (CAS), communication is established between the client and server over a secure connection. A control word to be encrypted is received by the client and encrypted using a first and second key. The first key is a global secret key (GSK) that is known to the client and the server without being communicated over the secure connection. The second key is a control word encryption key (CWEK) that is derived from a locally generated client nonce (CN) and a server nonce (SN) obtained from the server over the secure connection. The encrypted control word (ECW) is sent to the server over the secure connection.

18 Claims, 6 Drawing Sheets

(51) Int. Cl.
*H04N 21/835* (2011.01)
*H04L 9/08* (2006.01)

(56) References Cited

U.S. PATENT DOCUMENTS

| | | | |
|---|---|---|---|
| 2004/0242150 | A1 | 12/2004 | Wright et al. |
| 2005/0097340 | A1 | 5/2005 | Pedlow, Jr. et al. |
| 2006/0215838 | A1 | 9/2006 | Hwang et al. |
| 2008/0294786 | A1* | 11/2008 | Tinker ............... H04L 29/1249 709/229 |
| 2009/0028331 | A1 | 1/2009 | Millar et al. |
| 2009/0103731 | A1 | 4/2009 | Sarikaya |
| 2010/0067703 | A1* | 3/2010 | Candelore ............ H04L 9/0838 380/283 |
| 2011/0317833 | A1 | 12/2011 | Westerveld et al. |
| 2012/0008773 | A1 | 1/2012 | Westerveld |
| 2012/0060034 | A1 | 3/2012 | Hutchings et al. |

OTHER PUBLICATIONS

"Digital Video Broadcasting (DVB); Head-End Implementation of DVB SimulCrypt", ETSI TS 103 197 V1.5.1, Oct. 31, 2008, 293 pgs.

"Data Encryption Standard (DES)"; Federal Information Processing Standards Publication, FIPS Pub 46-3, Reaffirmed Oct. 25, 1999, 27 pgs.

"The Keyed-Hash Message Authentication Code (HMAC", Federal Information Processing Standards Publication, FIPS Pub 198, Mar. 6, 2002, 21 pgs.

M. Dworkin, "Recommendation for Block Cipher Modes of Operation: Methods and Techniques", National Institute of Standards and Technology (NIST), Technology Administration, U.S. Department of Commerce, NIST Special Publication 800-38A, Dec. 2001, 66 pgs.

T. Dierks, et al., "The Transport Layer Security (TLS) Protocol Version 1.1", Network Working Group Memo: Request for Comments: 4346, Apr. 2006, 82 pgs.

T. Dierks, et al., "The Transport Layer Security (TLS) Protocol Version 1.2", Network Working Group Memo: Rquest for Comments: 5246, Aug. 2008, 98 pgs.

JH Song, et al., "The AES-CMAC Algorithm", Network Working Group Memo: Request for Comments: 4493, Jun. 2006, 19 pgs.

"OpenCable™ Specifications CableCARD™ Copy Protection 2.0 Specification", OC-SP-CCCP2.0-I12-120531, May 31, 2012, 76 pgs.

* cited by examiner

PROTECTION OF CONTROL WORDS EMPLOYED BY CONDITIONAL ACCESS SYSTEMS

STATEMENT OF RELATED APPLICATION

This application claims the benefit of U.S. Ser. No. 61/802,090, filed Mar. 15, 2013 and entitled: "SIMULCRYPT INTERFACE WITH CONTROL WORD PROTECTION," which is hereby incorporated by reference in its entirety.

BACKGROUND

Recent advances in digital information processing have made a wide range of services and functions available for delivering content to consumers at their premises. These services and functions include digital programming (movies, etc.), digital video-on-demand (VOD), personal video recorder (PVR), Internet Protocol television (IPTV) and digital media playback and recording. These services are typically provided by multiple vendors including e.g., cable service providers (e.g., MSOs), satellite television network providers, cellular service providers (CSPs) and so on.

Conditional access systems are well known and widely used in conjunction with various ones of the aforementioned content delivery services. Such systems provide secure transmission of a content stream to a digital receiver contained, for example, in a set-top box or a mobile terminal supporting content delivery services. To protect the content from unauthorized viewing, the data packets in the streams are scrambled (encrypted) with a randomly generated encryption key commonly referred to as a control word. In order to increase the security of the streams, the control words are changed periodically.

In order to descramble the scrambled data packets in the transport stream, the receiver must be informed about the current value of the control word. For the secure transmission of the control words, they are encrypted and sent in so-called entitlement control messages (ECMs) to the receiver. In order to process the ECMs, entitlement management messages (EMMs) transmit and manage the keys needed to decrypt ECMs. The ECM and EMM information streams are sent to the receiver in order to allow the receiver to decrypt EMMs, the ECMs and to descramble the content to which the subscriber is entitled.

The Digital Video Broadcast (DVB) SimulCrypt standard provides a common way for conditional access providers to interface with a scrambler (or encrypter) in order to receive the control words and synchronize the distribution of ECMs. The interface allows content to be secured by multiple Conditional Access (CA) providers since they each receive the same control word. This approach is called "key sharing" and the full system is described in the European Telecommunications Standards Institute (ETSI) TS 103 197 V1.3.1 (02-06) TM2117r3 Technical Specification for "Digital Video Broadcasting (DVB); Head-end implementation of DVB SimulCrypt". DVB SimulCrypt is often cited as an alternative to Selective Multiple Encryption in situations where the CA providers are "cooperating" through key sharing.

In the SimulCrypt protocol, a standardized SimulCrypt synchronizer (SCS) is utilized with an entitlement control message generator (ECMG) interface to allow multiple conditional access systems to operate in parallel, each generating its own ECMs.

SUMMARY

In order to allow multiple conditional access systems to obtain the control words from the encryptor, the control words should be communicated between the encryptor and the conditional access systems in a secure manner. In contrast, such protection is generally not needed when a single multi-service operator (MSO) controls both the encryption and conditional access platforms. In accordance with some aspects of the invention, control of the control word transfer process is maintained with the use of digital certificates so that the various entitlement control message generators (ECMGs) allowed to access the control words can be restricted in a scalable manner. Moreover, the control word may be protected by a secure hardware element so that even if the software protection mechanisms are compromised the control words will not be accessible to unauthorized parties. Additionally, in some embodiments the protection mechanism that is employed allows the control words to be accessed by multiple ECMGs that are used by a single conditional access vendor for purposes of load balancing.

DETAILED DESCRIPTION

As noted above, the SimulCrypt standard provides a common way for conditional access providers to interface with an encryptor in order to receive control words and distribute ECMs and EMMs. The interface allows content to be secured by multiple Conditional Access (CA) providers since they each receive the same shared control word. Under the DVB SimulCrypt standard a random number is generated for use as a control word and shared with CA providers. The random number is used as an encryption key by the encryptor to scramble content. The CA providers encrypt the key using proprietary CA algorithms and methods and generate Entitlement Control Messages (ECMs) to allow receivers to access content.

Typically, the control words are communicated from the encryptor to the CA provider in the clear, i.e., without encryption. This may be a satisfactory arrangement when the party encrypting the content also provides the CA platform, as is the case, for example, in a secure, isolated MSO network. However if one party provides the encryption and another provides the CA platform, a secure transfer of control words is desirable to prevent misappropriation of the control words. Moreover, even if a single party provides both the encryption and CA platforms, the secure transfer of control words may be desirable to prevent the control words from being stolen, which could allow, for example, an unauthorized party to decrypt recorded content.

In other to adequately protect the control words, some implementations described herein may satisfy the following two security requirements. First, overall control word security should be maintained using a protected secret that is stored in hardware. Protection achieved solely through software (that is, control word protection using keys derived solely in software) may be inadequate in these implementations. Two, the ECMG and SCS should undergo authorization before they are capable of exchanging control words. In some cases issuance of digital certificates (i.e., X.509 certificates) to the ECMG and SCS may be used to satisfy this latter requirement.

Before discussing in detail how these two security requirements may each be achieved, an overview of an illustrative operating environment that employs an ECMG and SCS will be presented.

Illustrative Operating Environment

Figure 1:
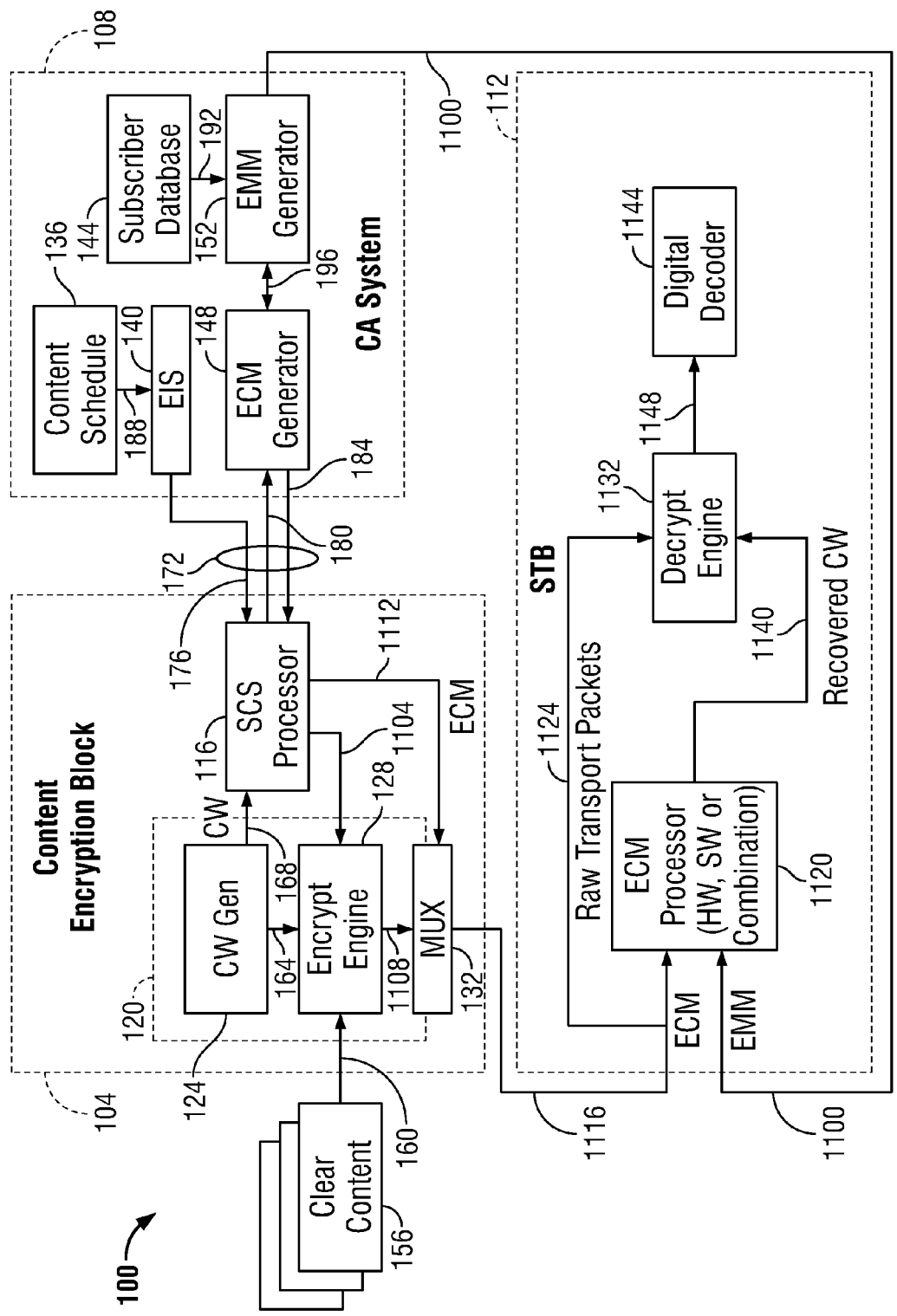
FIG. 1 shows one illustrative configuration of a digital video broadcast (DVB) system.

FIG. 1 shows one possible configuration of a DVB system 100. This example system complies with the Digital Video Broadcast (DVB) specification (but the inventions disclosed hereinafter are not necessarily limited to such systems). Accordingly, all components and interfaces are described in detail in the DVB specification. The detail that is presented here is for background informational use. The reader is referred to the DVB specification for specific details beyond those needed for the intended overview presented here.

DVB system 100 includes content encryption block 104, conditional access system 108 and television Set-Top Box (STB) 112. Within content encryption block 104 (content encryption block 104 and CA system 108 are generally located at the cable system headend or content distribution broadcast center) are Simulcrypt Synchronizer (SCS) Processor 116 and content encryption block 120. Within the content encryption block 120 are control word generator 124 and encrypt engine 128. Output multiplexer (mux) 132 is the final block within content encryption block 104.

Within conditional access system 108 are the content scheduler 136, the event information scheduler (EIS) 140, the subscriber database 144, the ECM generator 148 and the EMM generator 152.

With the major components identified so far, an example DVB encryption cycle can be discussed. Clear content 156 is received by encrypt engine 128 on content interface 160. Likewise, the current control word is received by encrypt engine 128 from control word generator 124 on control word interface 164. The same control word is transferred from control word generator 124 to SCS processor 116 on control word interface 168.

Communications between the content encryption block 104 and conditional access system 108 occurs over the communications link 172. Conditional access system communications link 172 is composed of several other interfaces, namely access criteria interface 176, control word and access criteria interface 180 and ECM interface 184.

During the typical DVB encryption cycle, EIS 140 receives information from content scheduler 136 on content schedule interface 188 and transmits this information to SCS processor 116 on access criteria interface 176. SCS processor 116 then transmits the control word received from control word generator 124 on control word interface 168 and the access criteria received from EIS 140 on access criteria interface 176 to ECM generator 148 across control word and access criteria interface 180.

Likewise, EMM generator 152 interfaces with subscriber database 144 across subscriber database interface 192 to retrieve information necessary to create EMM messages. ECM generator 148 and EMM generator 152 communicate across ECM/EMM interface 196 to communicate information that is necessary for ECM generator 148 to create ECM messages. EMM packets are transferred to STB 112 across EMM packet interface 1100 and ECM messages are transferred from ECM generator 148 to SCS processor 116 across ECM interface 184 to complete the current actions of the conditional access system 108.

Encrypt engine 128 outputs an encrypted stream of data on interface 1108 to output MUX 132 while SCS processor 116 transmits the ECM message (intended to be placed into the outgoing transport stream) across signal ECM insertion interface 1112 to output MUX 132. The final encrypted transport stream with ECMs inserted is then output from content encryption block 104 on transport stream interface 1116. Transport stream interface can be any of a cable network, satellite network, or any other suitable communication medium. In some implementations the EMMs as well as the ECMs also may be transferred to the STB 112 across the transport stream interface 1116. That is, both the ECMs and the EMMs may be sent in an in-band manner along with the encrypted content.

At STB 112, the transport stream is received and ECM processor 1120 strips out the ECM packets from transport stream interface 1116. The raw transport packets are passed along transport packet interface 1124 to decrypt engine 1132. EMM packets are received on EMM packet interface 1100 (again any suitable communication medium, for example an out of band delivery mechanism per the DVB specification, connects EMM generator 152 and ECM processor 1120) by ECM processor 1120. A recovered control word is output to the decrypt engine 1132 across recovered control word interface 1140. Finally, clear transport data is transmitted to the digital decoder 1144 across clear transport interface 1148.

Control Word Protection

Figure 2:
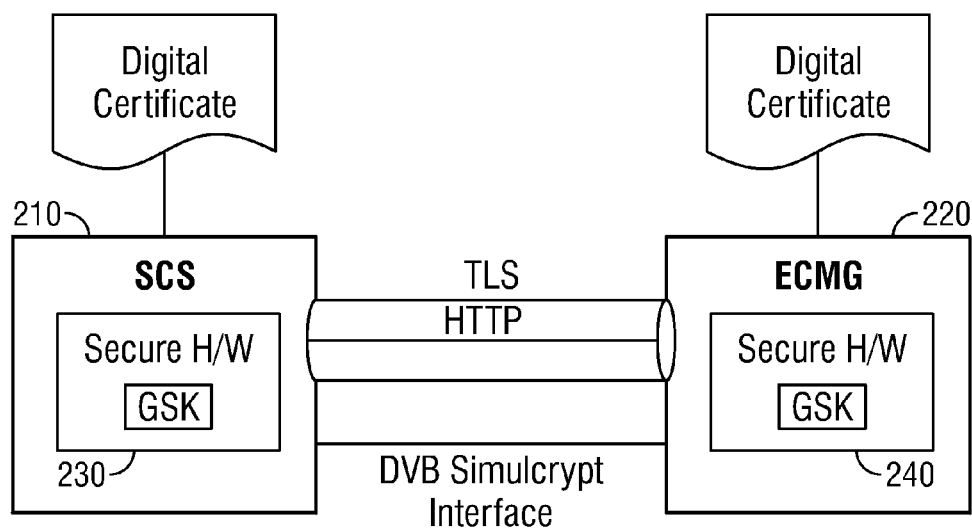
FIG. 2 shows the basic elements used to securely transmit control words from the SimulCrypt Synchronizer (SCS) to the entitlement control message generator (ECMG) shown in FIG. 1.

FIG. 2 shows the basic elements used to securely transmit control words from an SCS 210 and an ECMG 220, which respectively may correspond, for example, to SCS 116 and ECMG 148 shown in FIG. 1. As shown, an HTTPS connection (protected with TLS) is established between the ECMG and SCS, with client and server digital certificate authentication. As explained below, this connection is used to establish a shared key that is utilized in the encryption of control words. In addition, a DVB SimulCrypt interface is established between the ECMG and SCS for exchange of encrypted control words and associated ECMs. The SCS and ECMG each contain a secure, tamper-resistant hardware module 230 and 240 for storing one or more global secret keys (GSKs), which are used in combination with a secret encryption key for encryption of the control words. The ECMG and SCS derive the secret encryption key and a secret authentication key based on nonces that they each generate. Each GSK has a GSK identifier associated therewith. As discussed below, the SCS and the ECMG only exchange the GSK identifiers and not the GSKs themselves.

It should be noted that while the example described herein employs a DVB SimulCrypt interface between the SCS 210 and the ECMG 220, in alternative implementations other interfaces and protocols may be employed instead.

Figure 3:
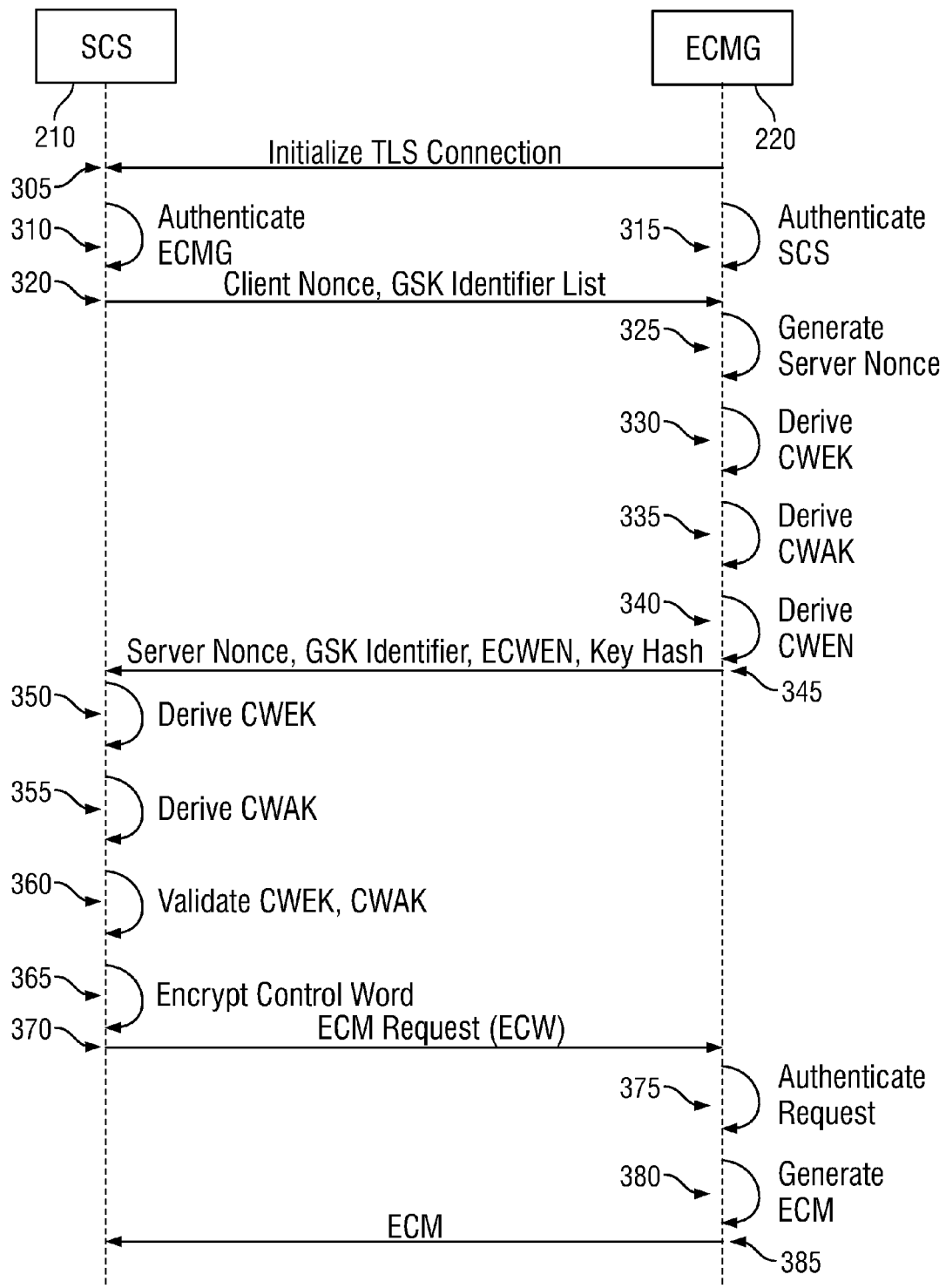
FIG. 3 is a sequence diagram illustrating one example of a message flow that may be exchanged between the SCS and the ECMG shown in FIGS. 1 and 2.

FIG. 3 is a sequence diagram illustrating one example of a message flow that may be exchanged between the SCS 210 and the ECMG 220 in order to communicate an encrypted control word from the SCS to the ECMG. It should be noted that the details of this message exchange process will depend on many factors that may differ from case to case. Accordingly, the message exchange process shown in FIG. 3 is presented for illustrative purposes only and should not be construed as limiting in any way. Moreover, the data included in the messages may be combined into a fewer number of messages or, in some cases, divided among a greater number of messages.

To begin the process, a secure communication session is established between SCS and the ECMG. Although a wide variety of secure protocols may be employed, the Transport Layer Security (TLS) protocol will be illustrated by way of example. The TLS protocol includes a TLS handshake to exchange a series of messages between a server and client when they first establish a TLS connection. The TLS handshake allows the server to authenticate itself to the client and the client to authenticate itself to the server.

In FIG. 3 the TLS session is initialized at 305. During the initialization process the SCS and the ECMG agree on various parameters used to establish the connection's security. Next, as part of the handshake process the SCS and the ECMG exchange digital certificates. In some implementations the digital certificates may be issued by the Conditional Access (CA) vendor itself or, more generally, by a certificate authority associated with the CA vendor. In this way the CA vendor can maintain control through a licensing process over the parties that wish to connect to the ECMG. The SCS uses the ECMG certificate to authenticate the ECMG at 310 and the ECMG uses the SCS certificate to authenticate the SCS at 315. At this point the TLS connection is established. The subsequent messages exchanged in the example of FIG. 3 are all exchanged over this secure connection.

The SCS generates a client nonce (CN) and sends it, along with a list of GSK identifiers, to ECMG at 320. The list of GSK identifiers identify the GSK(s) maintained in the secure hardware module of the SCS.] The ECMG generates a server nonce (SN) at 325. The ECMG uses both the CN and the SN to derive a control word encryption key (CWEK) and an optional control word authentication key (CWAK) at 330 and 335, respectively.

Additionally, the ECMG also derives a control word encryption nonce (CWEN) at 340 by combining (e.g., concatenating) the SN and CN. The ECMG encrypts the CWEN with its own key (which may be a symmetric secret key or a public key, part of an asymmetric public/private key pair) to form an encrypted CWEN (ECWEN). As will be explained below, the ECWEN is used when the CA system employs multiple ECMGs for load balancing purposes. The ECWEN may be decrypted by the multiple ECMGs but not by the SCS (since it does not have access to the private key of the ECMG).

The ECMG also selects one of the GSK identifiers and sends the selected identifier, the SN and the ECWEN to the SCS at 345. The ECMG may also send the SCS a hash of the CWEK and the CWAK for verification purposes. Since the SCS is now in possession of the SN, it can derive the CWEK using the CN and the SN at 350. If the optional CWAK is employed, it too can be derived by the SCS at 355 using the CN and the SN. The SCS then validates the CWEK and the optional CWAK at 360 using the hash of the CWEK and the CWAK supplied by the ECMG.

The SCS encrypts the CW at 365 using the GSK corresponding to the GSK identifier selected by the ECMG and the CWEK to derive the encrypted CW (ECW). It should be noted that while the GSK is used in the encryption/decryption of the control words, it is not used in the derivation of the CWEK or the CWAK.

The SCS may send the ECW to the ECMG at 370 in a variety of different ways. For example, when a Simulcrypt interface is employed between the SCS and the ECMG, the ECW may be sent in a Simulcrypt compliant message that allows for custom parameters or extensions. As part of this message the SCS may include a control word authenticator (CWA), which is derived using the ECW and the CWAK. The CWA may be subsequently used by the ECMG to authenticate the CW it receives.

The SCS can repeatedly send subsequent control words to the ECMG using the same CWEK (and CWAK) each time it requests an ECM. For each of these requests the ECMG validates the request and if authenticated at 375 responds by sending to the SCS an ECM that can be inserted into the transport stream. Since the CW is now encrypted these requests and responses do not necessarily need to be transmitted over the secure connection (e.g., the TLS connection). Of course, in some implementations a secure connection nevertheless may be used to provide additional security.

The authentication process shown at 375 may be performed by the ECMG using the CWAK. In particular, the ECMG uses the ECW and the CWAK to calculate the CW authenticator (CWA). Authentication is successful if the CWA determined by the ECMG matches the CWA received from the SCS. In this way the ECMG verifies that it has received the correct control word. The ECMG generates the ECM at 380 and sends it to the SCS at 385.

The CWEK and CWAK may be re-established at the discretion of the SCS. That is, the SCS may choose to establish a new CWEK and CWAK at any desired time. For instance, in some cases new CWEKs and CWAKs may be periodically established at some configurable time interval (e.g., 1 day to 1 week).

As previously mentioned, the control word encryption nonce (CWEN) is derived by the ECMG by combining (e.g., concatenating) the SN and CN. The CWEN is encrypted using the ECMG private key to establish the ECWEN, which is used when the CA system employs multiple ECMGs for load balancing purposes. The ECWEN is common to the load balancing group of ECMGs. An ECMG in the load balancing group which receives an ECM request that includes the ECWEN may first look for a cached set of control word protection keys (CWEK and CWAK) corresponding to the ECWEN when decrypting the ECW included in the request. If the control word protection keys are not already known to the ECMG, the ECMG can decrypt the ECWEN using a shared ECMGK and utilize the CN and SN to derive the appropriate CWEK and CWAK.

Figure 4:
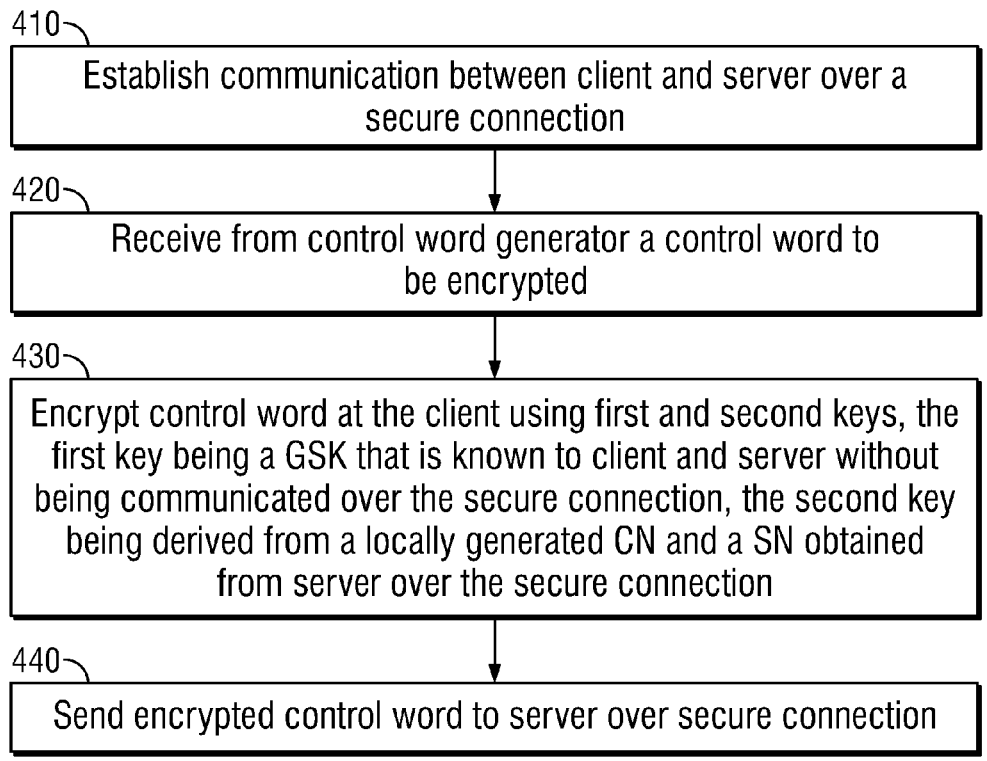
FIG. 4 is a flowchart showing one example of a method for communicating a control word to a server associated with a conditional access system (CAS).

FIG. 4 is a flowchart showing one example of a method for communicating a CW to a server associated with a conditional access system (CAS). The server may be, for example, an ECMG for incorporating the CW in an ECM. The method begins at block 410 when communication is established between a client (e.g., an SCS) and the server over a secure connection. The client receives a CW to be encrypted from e.g., a CW generator at block 420. The client encrypts the control word at block 430 using a first and second key. The first key is a GSK that is known to the client and the server without being communicated over the secure connection. The second key is a CWEK that is derived from a locally generated CN and a SN obtained from the server over the secure connection. The encrypted control word is sent to the server by the client over the secure connection at block 440.

Figure 5:
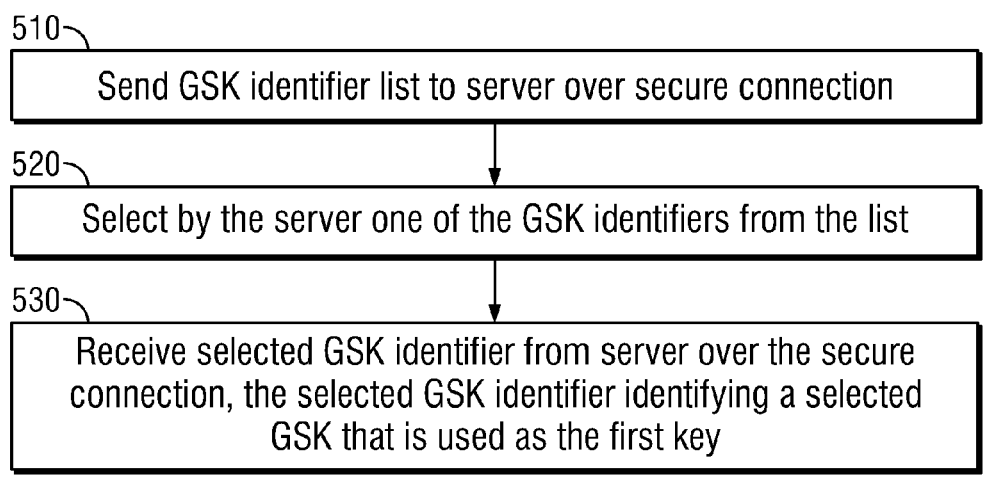
FIG. 5 is a flowchart showing one example of a method by which a client and server select the global secret key (GSK) without communicating it over the secure connection.

FIG. 5 is a flowchart showing one example of a method by which the client and server select the GSK used at block 430 without being communicated over the secure connection. The client sends a list of GSK identifiers (but not the GSKs themselves) to the server over the secure connection at block 510. Each of the GSK identifiers identify a different GSK that the client and server each store in a secure hardware module. The server selects one of the GSK identifiers to the client at block 520 and sends the selected GSK identifier to the client over the secure connection at block 530. The selected GSK identifier identifies the selected GSK that is used as the first key at block 430 in FIG. 4.

Figure 6:
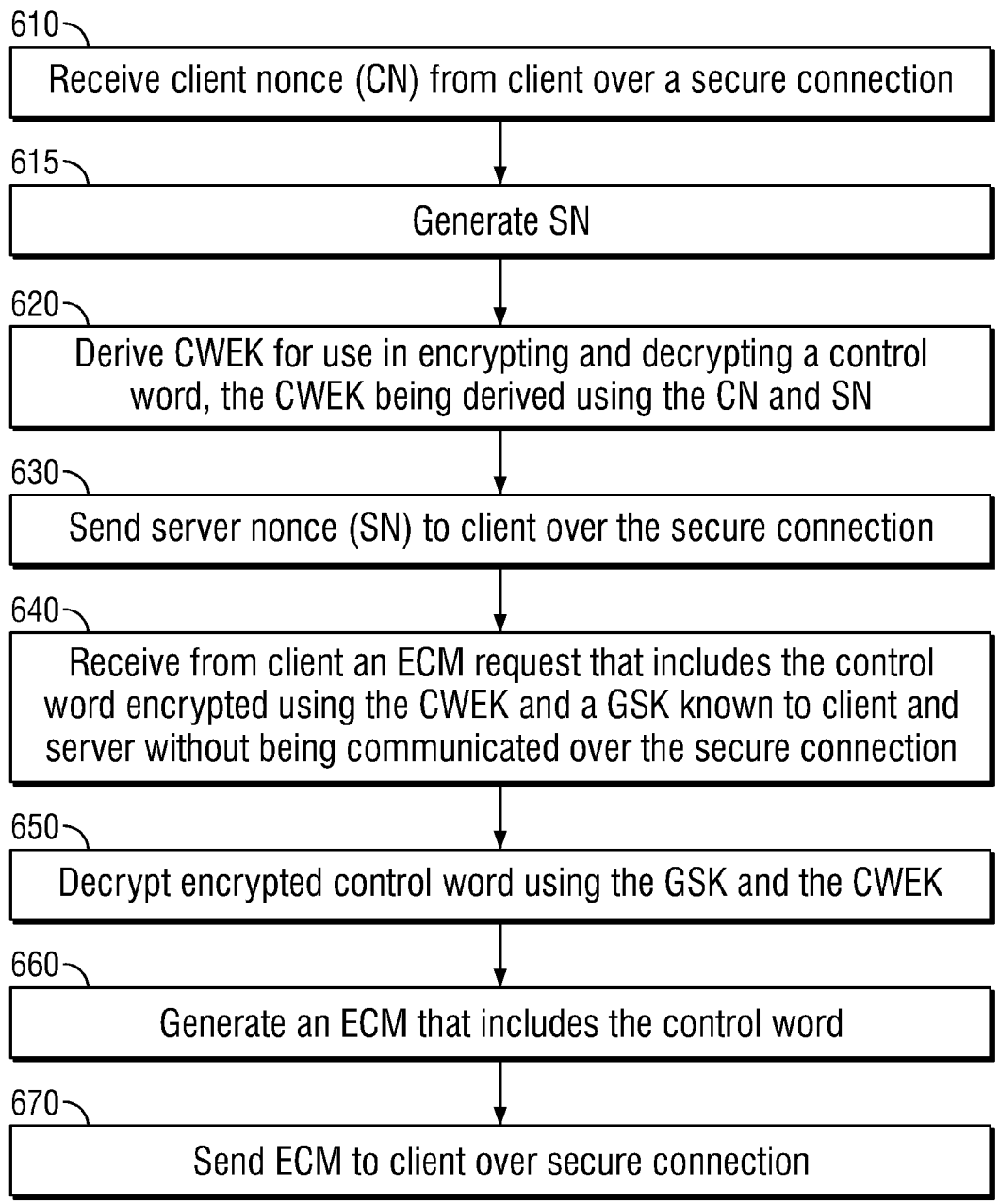
FIG. 6 is a flowchart showing one example of a method by which an ECMG provides an entitlement control message (ECM) to a client such as an SCS.

FIG. 6 is a flowchart showing one example of a method by which an ECMG provides an ECM to a client such as an SCS. The method begins at block 610 when the ECMG receives a client nonce (CN) from the client over a secure connection between the client and a server. The ECMG generates a server nonce (SN) at block 615. At block 620 the ECMG derives a CWEK for use in encrypting and decrypting a control word. The CWEK is derived using the CN and the SN. The ECMG sends the SN at block 630 from the server to the client over the secure connection. The ECMG receives from the client a request for receipt of a ECM at block 640. The request includes the control word in encrypted form using the CWEK and a GSK that is known to the client and the server without being communicated over the secure connection. The encrypted control word is decrypted by the ECMG using the GSK and the CWEK at block 650. The ECMG generates an ECM that includes the control word at block 650 and sends the ECM to the client over the secure connection at block 670.

Aspects of the subject matter described herein are operational with numerous general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules or components, being executed by a computer. Generally, program modules or components include routines, programs, objects, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Figure 7:
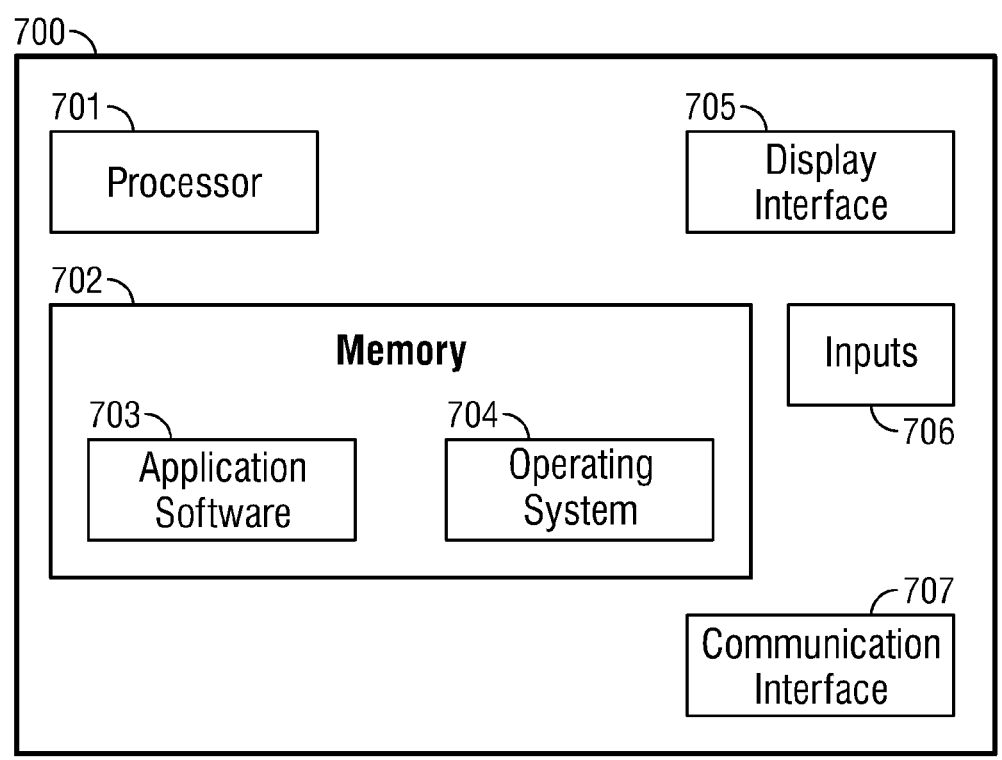
FIG. 7 illustrates various components of an illustrative computing-based device.

FIG. 7 illustrates various components of an illustrative computing-based device 700 which may be implemented as any form of a computing and/or electronic device, and in which embodiments of a server (e.g., ECMG 148 in FIG. 1) and/or a client (e.g., SCS 116 in FIG. 1) as described above may be implemented.

The computing-based device 700 comprises one or more inputs 706 which are of any suitable type for receiving media content, Internet Protocol (IP) input, activity tags, activity state information, resources or other input. The device also comprises communication interface 707 to enable the device to communicate with one or more other entity using any suitable communications medium.

Computing-based device 700 also comprises one or more processors 701 which may be microprocessors, controllers or any other suitable type of processors for processing computing executable instructions to control the operation of the device in order to provide a search augmentation system. Platform software comprising an operating system 704 or any other suitable platform software may be provided at the computing-based device to enable application software 703 to be executed on the device.

The computer executable instructions may be provided using any computer-readable media, such as memory 702. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. A display interface 705 is provided to control a display device to be used in conjunction with the computing device. The display system may provide a graphical user interface, or other user interface of any suitable type.

As disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, wireless channels, a SIM card, other smart cards, and various other mediums capable of storing, containing, or carrying instructions or data. However, computer readable storage media do not include transitory forms of storage such as propagating signals, for example.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable storage medium and executed by one or more processors.

Although the subject matter has been described in language specific to structural features and/or methodological acts, it is to be understood that the subject matter defined in the appended claims is not necessarily limited to the specific features or acts described above. Rather, the specific features and acts described.

The invention claimed is:

1. A method for providing secure transmission of video, wherein the transmission provides for communicating a control word (CW) to a server associated with a conditional access system (CAS), comprising:
    establishing communication between a client and the server over a secure connection to transmit the video;
    receiving at the client a control word to be encrypted;
    encrypting at the client the control word using a first and second key, the first key being a global secret key (GSK) that is known to the client and the server without being communicated over the secure connection, the second key being a control word encryption key (CWEK) that is derived from a locally generated client nonce (CN) and a server nonce (SN) obtained from the server over the secure connection; and
    sending the encrypted control word (ECW) to the server over the secure connection,
    wherein the client is a SimulCrypt Synchronizer (SCS) and the server is an entitlement control message generator (ECMG) that generates entitlement control message (ECMs) using the control words received from the SCS.

2. A method for providing secure transmission of video, wherein the transmission provides for communicating a control word (CW) to a server associated with a conditional access system (CAS), comprising:
  establishing communication between a client and the server over a secure connection to transmit the video;
  receiving at the client a control word to be encrypted;
  sending a list of global secret key (GSK) identifiers to the server over the secure connection, each of the GSK identifiers identifying a different GSK; and
  receiving a selected GSK identifier over the secure connection, the selected GSK identifier identifying a selected GSK that is used as a first key
  encrypting at the client the control word using the first key and a second key, the first key being one of the GSKs that is known to the client and the server without being communicated over the secure connection, the second key being a control word encryption key (CWEK) that is derived from a locally generated client nonce (CN) and a server nonce (SN) obtained from the server over the secure connection; and
  sending the encrypted control word (ECW) to the server over the secure connection.

3. A method for providing secure transmission of video, wherein the transmission provides for communicating a control word (CW) to a server associated with a conditional access system (CAS), comprising:
  establishing communication between a client and the server over a secure connection to transmit the video, wherein the server is one of a plurality of load-balancing servers associated with the CAS;
  receiving an encrypted control word encryption nonce (CWEN) from the server over the secure connection, the CWEN being derived from a locally generated client nonce (CN) and a server nonce SN;
  encrypting at the client the control word using a first key and a second key, the first key being one of the GSKs that is known to the client and the server without being communicated over the secure connection, the second key being a control word encryption key (CWEK) that is derived from the CN and the SN;
  sending the encrypted control word (ECW) to the server over the secure connection;
  encrypting the CWEN using a key associated with the server, the encrypted CWEN being available to and decryptable by the plurality of servers;
  sending the encrypted CWEN to the server along with the encrypted control word.

4. The method of claim 3, wherein the CWEN is derived by combining the CN and the SN.

5. The method of claim 2, wherein each of the GSKs is maintained in a secure hardware module associated with the client and further comprising accessing the selected GSK from the secure hardware module.

6. The method of claim 1, further comprising sending an ECM request to the ECM generator over the secure connection, the ECM request including the encrypted control word.

7. The method of claim 1, wherein establishing communication between the client and the server over the secure connection includes authenticating the SCS using a digital certificate issued by a certificate authority associated with the CAS.

8. The method of claim 7, wherein the secure connection conforms to a Transport Layer Security (TLS) protocol.

9. The method of claim 1, further comprising:
  deriving a control word authentication key (CWAK) from the locally generated CN and the SN;
  generating a control word authenticator (CWA) using the ECW and the CWAK; and
  sending the CWA to the server for use in authenticating the CW.

10. One or more non-transitory computer-readable storage media containing instructions which, when executed by one or more processors allow secure transmission of video, wherein the processor accomplishes the transmission performing a method comprising:
  receiving a client nonce (CN) from a client associated with an encryption engine over a secure connection between the client and a server associated with a conditional access system (CAS);
  sending a server nonce (SN) from the server to the client over the secure connection;
  deriving a control word encryption key (CWEK) for use in encrypting and decrypting a control word, the CWEK being derived using the client nonce (CN) and the server nonce (SN);
  receiving a list of global secret key (GSK) identifiers over the secure connection, each of the GSK identifiers identifying a different GSK;
  selecting a GSK identifier, the selected GSK identifier identifying a selected GSK that is used by the client to encrypt the control word;
  sending the selected GSK identifier to the client;
  receiving from the client a request for receipt of an entitlement control message (ECM), the request including the control word in encrypted form using the CWEK and an identified one of the global secret keys (GSK) that is known to the client and the server without being communicated over the secure connection;
  decrypting the encrypted control word using the GSK and the CWEK; and
  generating an ECM that includes the control word; and sending the ECM to the client over the secure connection.

11. The one or more computer-readable storage media of claim 10, further comprising:
  deriving a control word authentication key (CWAK) for use in authenticating the control word, the CWAK being derived using the CN and the SN;
  deriving a control word authentication (CWA) using the encrypted control word and the CWAK;
  comparing the derived CWA to a CWA received from the client; and
  authenticating the control word if the derived CWA matches the CWA received from the client.

12. The one or more computer-readable storage media of claim 10, further comprising:
  deriving a control word encryption nonce (CWEN) using the CN and SN;
  encrypting the CWEN with a private key associated with the server; and
  sending the encrypted CWEN (ECWEN) to the client.

13. The one or more computer-readable storage media of claim 12, wherein the server is one of a plurality of load-balancing servers associated with a CAS, the ECWEN being available to and decryptable by the plurality of servers, and further comprising:
  receiving the ECWEN from the client along with the encrypted control word; and
  obtaining the CWEK by identifying a cached CWEK corresponding to the received ECWEN.

14. The one or more computer-readable storage media of claim 12, wherein deriving the CWEN further comprises combining the CN and SN to form the CWEN.

15. The one or more computer-readable storage media of claim 10, further comprising accessing the GSK from a secure hardware module associated with the server.

16. The one or more computer-readable storage media of claim 10, wherein the server is an ECM generator associated with the CAS.

17. The one or more computer-readable storage media of claim 16, further comprising establishing communication between the client and the ECM generator over the secure connection, wherein establishing communication includes authenticating the client using a digital certificate issued by a certificate authority associated with the CAS.

18. The one or more computer-readable storage media of claim 10, wherein the secure connection conforms to a Transport Layer Security (TLS) protocol.

* * * * *